(12) United States Patent
Hwu et al.

(10) Patent No.: US 11,276,106 B2
(45) Date of Patent: Mar. 15, 2022

(54) SYSTEM AND METHOD FOR CLAW BACK AND PRICE PROTECTION

(71) Applicant: Wells Fargo Bank, N.A., San Francisco, CA (US)

(72) Inventors: Albert Hwu, San Francisco, CA (US); Chris Kalaboukis, San Jose, CA (US); Ashish B. Kurani, Hillsborough, CA (US); Kristine Ing Kushner, Orinda, CA (US); Nikolai Stroke, Gilbert, AZ (US); Raissa Williams, San Franciso, CA (US); Young M. Yang, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 234 days.

(21) Appl. No.: 16/216,928

(22) Filed: Dec. 11, 2018

(65) Prior Publication Data
US 2020/0184543 A1  Jun. 11, 2020

(51) Int. Cl.
G06Q 30/06 (2012.01)
G06K 9/00 (2006.01)
G06Q 20/40 (2012.01)

(52) U.S. Cl.
CPC ..... *G06Q 30/0637* (2013.01); *G06K 9/00302* (2013.01); *G06Q 20/407* (2013.01); *G06Q 30/0627* (2013.01); *G06Q 30/0641* (2013.01)

(58) Field of Classification Search
CPC ............ G06Q 30/0637; G06Q 20/407; G06Q 30/0627; G06Q 30/0641; G06Q 30/0601–0645; G06K 9/00302

USPC ............................................... 705/26.1–27.2
See application file for complete search history.

(56) References Cited

U.S. PATENT DOCUMENTS

| | | | |
|---|---|---|---|
| 8,249,965 B2 | 8/2012 | Tumminaro | |
| 8,608,065 B2 | 12/2013 | Wilson | |
| 8,650,114 B2 | 2/2014 | Pappas et al. | |
| 9,626,724 B2 | 4/2017 | Tatham et al. | |
| 9,996,834 B2 | 6/2018 | Powell et al. | |
| 10,025,946 B1* | 7/2018 | Holenstein | G06F 21/6218 |

(Continued)

OTHER PUBLICATIONS

Nick Bartlett, PayPal v. Escrow Services: Efficienct and Safety by the Numbers, Byte Technology, May 1, 2014 (Year: 2014).*

*Primary Examiner* — Marissa Thein
*Assistant Examiner* — Anna Mae Mitros
(74) *Attorney, Agent, or Firm* — Foley & Lardner LLP

(57) ABSTRACT

A computing system includes one or more processors and one or more computer-readable storage media having instructions stored thereon that, when executed by the one or more processors, causes the one or more processors to receive a pending purchase order from a user device in response to a selection of an interactive element presented on a payment page of an online store via the user device, the pending purchase order corresponding to a purchase of a good or service from the online store and including payment information, store the payment information in an escrow database for a window of time, generate a notification corresponding to the pending purchase order, the notification including information corresponding to the good or service and excluding the payment information, and transmit the notification to a merchant system associated with the online store to reserve the good or service during pendency of the window of time.

20 Claims, 3 Drawing Sheets

(56) References Cited

U.S. PATENT DOCUMENTS

| | | |
|---|---|---|
| 2008/0015985 A1 | 1/2008 | Abhari et al. |
| 2008/0243666 A1 | 10/2008 | Rowan |
| 2010/0106611 A1 | 4/2010 | Paulsen et al. |
| 2012/0089483 A1* | 4/2012 | Patel .................. G06Q 30/0641 |
| | | 705/26.41 |
| 2013/0036029 A1* | 2/2013 | Patt ....................... G06Q 30/08 |
| | | 705/27.1 |
| 2014/0019352 A1 | 1/2014 | Shrivastava |
| 2014/0195416 A1 | 7/2014 | Linscott et al. |
| 2015/0193858 A1* | 7/2015 | Reed .................. G06Q 30/0633 |
| | | 705/26.8 |
| 2015/0332226 A1* | 11/2015 | Wu ...................... G06Q 20/425 |
| | | 705/39 |
| 2016/0042364 A1* | 2/2016 | Zamer ................ G06Q 30/0201 |
| | | 705/7.29 |
| 2016/0071095 A1* | 3/2016 | Foerster ................ G06Q 20/20 |
| | | 705/65 |
| 2017/0032358 A1 | 2/2017 | Gibson |
| 2017/0061438 A1 | 3/2017 | Patel |
| 2017/0178134 A1 | 6/2017 | Senci et al. |
| 2017/0200158 A1 | 7/2017 | Honey et al. |
| 2017/0278172 A1* | 9/2017 | Dey .................. G06Q 30/0633 |
| 2018/0082275 A1 | 3/2018 | Course et al. |

* cited by examiner

SYSTEM AND METHOD FOR CLAW BACK AND PRICE PROTECTION

BACKGROUND

In the digital age, online purchases for goods and services are common occurrences, where a consumer browses an online store or catalog offering various goods and services for sale and purchases the goods and services from the online store or catalog. The online store or catalog may be specifically associated with a particular merchant, or may be a general online shopping website, platform, or application that offers a variety of goods and services for sale from various suppliers (e.g., merchants or individuals). When the consumer purchases a good or service from the online store or catalog electronically, the consumer generally provides payment information to initiate an electronic transfer for payment in order to receive delivery of the good or service. In this case, the consumer generally provides the payment information in an electronic form via the online store or catalog, and submits the payment information electronically to be processed. Once the electronic payment has been submitted and processed, the consumer's order is processed for fulfillment (e.g., scheduled for delivery). Due to the nature of electronic fund transfer and online stores, platforms, and applications, clawing back submitted electronic payments is different from clawing back payments made during face-to-face transactions. Clawing back submitted electronic payments poses unique challenges in the context of online stores, platforms, and applications.

For example, after the electronic payment has been submitted and processed, the consumer is generally prevented from cancelling or making any changes to the order, or may be given only a short period of time immediately after placing the order to cancel or make changes to the order. Thus, the consumer may be unable to make changes or even cancel the order after the payment has been submitted and processed. In this case, if the good or service is non-refundable, the consumer may be stuck with the good or service once the electronic payment has been submitted and processed. Further, even if the good or service can be returned for a refund, the consumer is generally required to first wait until the good or service is delivered, and then must ship the good or service back to the merchant or supplier in order to receive the refund. Accordingly, the funds used to pay for the good or service may be tied-up for several days or even weeks until the returned good or service is received and processed for the refund.

On the other hand, some online stores or catalogs offer an electronic shopping cart or wish list that the consumer can add items (e.g., goods or services) to for later purchase. These electronic shopping carts and wish lists enable the consumer to keep track of the items added thereto without actually purchasing the items. Thus, the items added to the electronic shopping cart or wish list are not treated and processed like actual purchases. Instead, when the consumer is ready to purchase the items added to the electronic shopping cart or wish list, the consumer is generally required to navigate back to the electronic shopping cart or wish list, select the items to purchase therefrom, and submit the payment information for the items to be processed as a normal purchase order. However, since the items in the electronic shopping cart or wish list are not treated like actual purchases, by the time the consumer is ready to actually purchase the items, the items may be sold out or the sales price of the items may change.

These problems in online purchases are further exacerbated when several parties are involved with an online purchase. For example, a child may have to wait for a parent or guardian to purchase a good or service from an online store or catalog, or may purchase the good or service from the online store or catalog without first receiving permission from the parent or guardian. In another example, a consumer may wish to research the good or service or receive input from others (e.g., friends, family, experts, etc.) before actually purchasing the good or service. In yet another example, a group purchase of a good or service may require input from each party in the group or may require funds provided from each party in the group for a portion of the sales price. In still another example, an employee may need authorization from a manager in order to make a purchase. In each of these cases, unauthorized purchases or delays in purchasing the goods or services can lead to funds being unnecessarily tied-up, lost opportunities, and/or higher costs.

SUMMARY

One arrangement of the present disclosure is related to a computing system including one or more processors and one or more computer-readable storage media communicatively coupled to the one or more processors and having instructions stored thereon that, when executed by the one or more processors, cause the one or more processors to receive a pending purchase order from a user device in response to a selection of an interactive element presented on a payment page of an online store via the user device, the pending purchase order corresponding to a purchase of a good or service from the online store and including payment information, store the payment information in an escrow database for a window of time, generate a notification corresponding to the pending purchase order, the notification including information corresponding to the good or service and excluding the payment information, and transmit the notification to a merchant system associated with the online store to reserve the good or service during pendency of the window of time.

One arrangement of the present disclosure is related to a method including receiving, by one or more processors of a computing system, a pending purchase order from a user device in response to a selection of an interactive element presented on a payment page of an online store via the user device, the pending purchase order corresponding to a purchase of a good or service from the online store and including payment information storing, by the one or more processors in an escrow database coupled to the one or more processors, the payment information for a window of time, generating, by the one or more processors, a notification corresponding to the pending purchase order, the notification including information corresponding to the good or service and excluding the payment information, and transmitting, by the one or more processors, the notification to a merchant system associated with the online store to reserve the good or service during pendency of the window of time.

BRIEF DESCRIPTION OF THE DRAWINGS

The above and other aspects and features of the present disclosure will become more apparent to those skilled in the art from the following detailed description of the example arrangements with reference to the accompanying drawings, in which.

DETAILED DESCRIPTION

Figure 1:
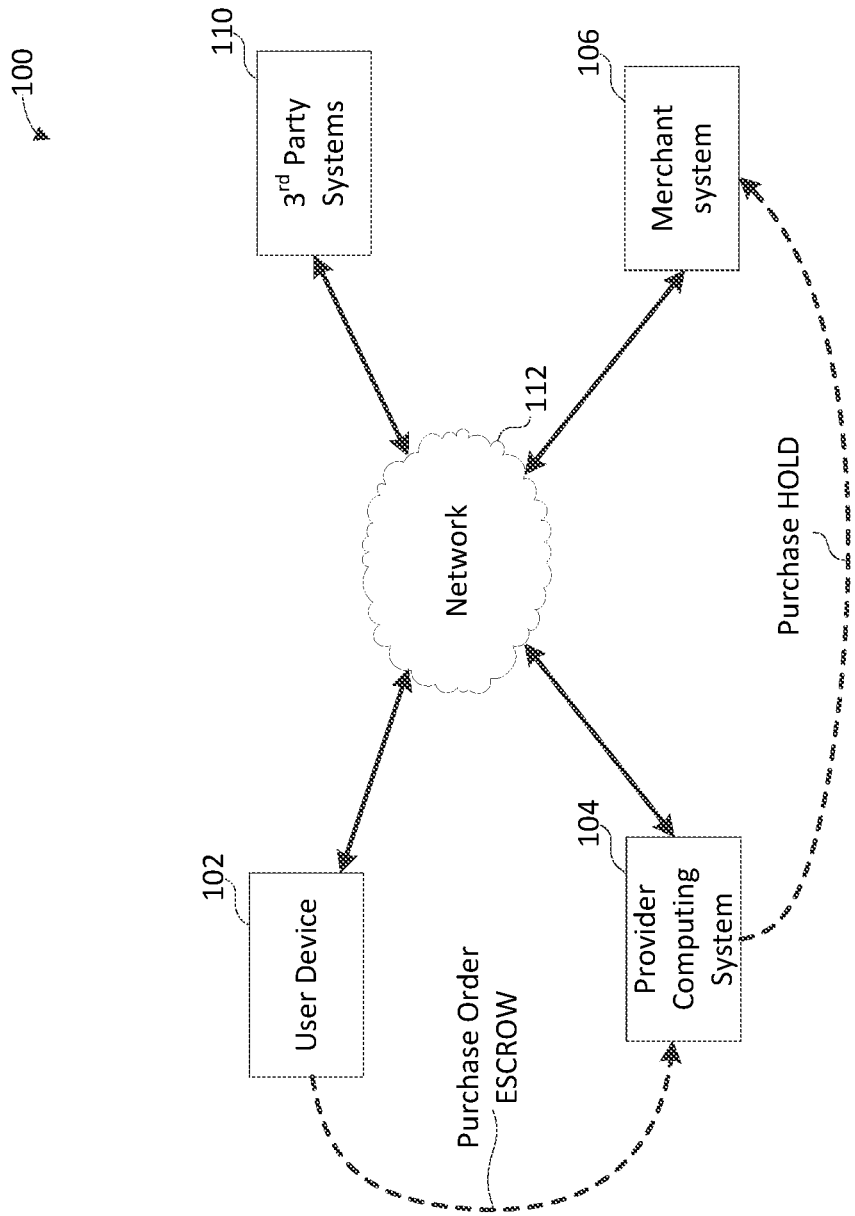
FIG. 1 is a diagram of an example of a system for providing automated payment escrow services for online purchases according to some arrangements.

One or more example arrangements described herein relate to systems, apparatuses, and methods for implementing Artificial Intelligence (AI) to provide automated payment escrow services for online purchases and electronic payments. The AI system automatically processes pending purchase orders to hold the payment information in escrow for a window of time, and notifies a merchant of the pending purchase order to reserve the goods and/or services while withholding the payment information from the merchant. Accordingly, while the window of time is pending, the user is enabled to make changes to or cancel the pending purchase order, while still reserving the goods or services at the offered price point. In some arrangements, the AI system automatically submits the payment information to the merchant at the expiration of the window of time, so that the pending purchase order can be processed by the merchant as a normal purchase order (e.g., for payment and delivery). In some arrangements, the AI system provides reminders to the user of the pending purchase order, and captures emotion detection data when the user views the reminders. In some arrangements, the AI system provides a recommendation to the user to modify, cancel, or proceed with the pending purchase order based on external data, the emotion detection data, and/or historical transaction data. As used in this specification, the terms "automatic" or "automatically" are defined as pertaining to an electronically carried out action that does not require outside (either human or machine) intervention to be scheduled, triggered, executed, and/or completed.

In general, the arrangements of the AI system described herein automate escrow services for online purchases that has not been previously automated. The AI system may be provided on the user device that a user used to make the purchase. The AI system described herein can provide automated escrow services for online purchases for any suitable online shopping website without having to change the code or functionality of the online shopping website. For example, the AI system detects when a user has navigated to a payment page within the online shopping website and can automatically append the escrow purchase option (or "hold now" option) on the payment page without any intervention from the online shopping website. The systems and methods disclosed herein can be adapted to monitor customers' account information, historical transaction data, merchant data, $3^{rd}$ party data, and other data and activities to identify relevant information associated with the pending purchase, to provide a recommendation to the user as to whether the pending purchase should be cancelled or modified.

The arrangements of the AI system described herein improve computer-related technology by performing certain steps that cannot be done by conventional provider institution systems or human actors. For example, the AI system is configured to proactively detect a user's activities over the World Wide Web using any suitable web browser, and can adapt the payment page of any suitable online shopping website to provide the payment escrow services described herein. In some arrangements, to achieve benefits over conventional systems having databases, tables, and field definitions that are static, the databases described herein may be data-type agnostic and configured to store different information for different users, transaction types, and the like. Furthermore, to achieve benefits over conventional databases and to solve a technical problem of improving dimensional scalability the data stored in multidimensional form may be aggregated and/or stored using improved methods. For example, various attributes of the pending purchase order (e.g., payment vehicle, goods and services, delivery information, and/or the like) may be dynamically modified and/or adjusted after being stored when the data is retrieved for analysis and/or forwarded for payment for delivery of the goods or services.

FIG. 1 is a diagram of an example of a system 100 for providing automated payment escrow services for online purchases according to some arrangements. Referring to FIG. 1, a user (e.g., a consumer, a customer, an authorized account user, or originator) of a user device 102 is a customer of a provider institution associated with a provider computing system 104. The user of the user device 102 may be any suitable entity (e.g., an individual, a company, or the like). In some arrangements, the provider institution may be a financial institution. Accordingly, the user may have an account (e.g., checking account, savings account, credit account, mortgage account, and/or the like) established with the provider institution, and the provider institution may store information corresponding to the user. For example, the provider institution may store a profile corresponding to the user in a data store (e.g., account database 240 in FIG. 2 or the like) accessible by the provider computing system 104. In some arrangements, the profile corresponding to the user may include information corresponding to the user, such as, for example, name, address, telephone number, business type, industry type, business hours, working days or non-working days, number of employees, net worth, assets, liabilities, and/or the like.

In some arrangements, the provider institution can collect and store transactional information (e.g., the payment information) in the course of dealing (e.g., processing transactions, offering products/services, and the like) with the user and other customers of the provider institution. For example, the user may operate the electronic device 102 to initiate an electronic transaction via the provider computing system 104 or via the merchant system 106 to make a payment to a beneficiary of the merchant system 106. The beneficiary may be any suitable entity (e.g., a merchant, an individual, a company, or the like). The merchant system 106 may be associated with any suitable online shopping site (e.g., online store, online catalog, and/or the like). The electronic transaction may be processed by the provider computing system 104, and transactional information corresponding to the electronic transaction may be collected and stored. In some arrangements, the transactional information may include, for example, information corresponding to the beneficiary (e.g., name, account and routing number, location or address, industry or business, and/or the like), transaction type, location where the transaction was initiated, amount of the transaction, date of the transaction, time of the transaction, and/or the like.

In some arrangements, the user may access an online store or an online catalog via the user device 102. In some arrangements, the online store or the online catalog may be presented to the user via the provider computing system 104 or via the merchant system 106. For example, in some arrangements, the online store or the online catalog may offer goods and services for sale by the provider institution or its affiliates. In another example, in some arrangements, the online store or the online catalog may offer goods and services for sale by the merchant (or beneficiary) of the merchant system 106. For example, in some arrangements, the merchant system 106 may provide access to the online store or the online catalog to the provider computing system 104 via any suitable application programming interface (API) to present the online store, the online catalog, or the contents thereof to the user on the user device 102 via the provider computing system 104. In still another example, in some arrangements, the user may operate the user device 102 to directly access the online store or the online catalog provided by the merchant system 106 (e.g., without first interacting with the provider computing system 104). In this case, the provider computing system 104 may provide purchase escrow services for the merchant system 106.

In some arrangements, the user may operate the user device 102 to browse the online store or the online catalog to purchase a good or service from the online store or the online catalog. For example, in some arrangements, the user may interact with the online store or online catalog by interacting with an application downloaded or otherwise installed on the user device 102. The application may be associated with the provider computing system 104 or the merchant system 106. In another example, the user may interact with the online store or online catalog associated with the provider computing system 104 or the merchant system 106 by interacting with a web browser that is installed on the user device 102. In this case, the user may interact with the online store or online catalog by accessing a website associated with the provider computing system 104 or the merchant system 106 via the web browser over the World Wide Web. However, the present disclosure is not limited thereto, and in other embodiments, the user may interact with the online store or online catalog via any suitable interface, program, application, widget, and/or the like that is installed or otherwise provided on the user device 102.

In some arrangements, when the user purchases a good or service from the online store or online catalog, the user provides payment information (e.g., by filling out fields in an electronic form), and places (e.g., submits) a purchase order for payment and delivery of the good or service. In some arrangements, when the user submits the purchase order via the user device 102, the provider computing system 104 intercepts or otherwise receives the purchase order. In some arrangements, the provider computing system 104 holds the purchase order in a purchase order escrow. In some arrangements, the provider computing system 104 generates a notification for a purchase hold, and sends the notification to the merchant system 106 to reserve the goods and/or services associated with the pending purchase held in the purchase order escrow for inventory planning purposes. However, in various arrangements, the provider computing system 104 withholds the payment information from the merchant, and instead, holds the payment information in the purchase order escrow for a window of time (e.g., predetermined or user defined). Thus, for example, the notification may include pending purchase information corresponding to the identity of the good(s) or service(s) associated with the purchase order, the price point for the good(s) or service(s), the length of the window of time that the payment information will be withheld in escrow, and/or the like, but excludes the payment information.

Accordingly, in some embodiments, the user is free to make changes to or cancel the pending purchase order held in the purchase order escrow before the window of time has lapsed. If the user has not modified or cancelled the pending purchase order before the window of time has lapsed, the provider computing system 104 automatically submits or otherwise provides the payment information in the purchase order escrow to the merchant at the expiration of the window of time. The merchant can then process the pending purchase order as a normal purchase order for payment and fulfillment (e.g., scheduled for delivery) under the terms of the original purchase order (e.g., at the agreed upon price). On the other hand, if the user later desires to make modifications to the purchase order held in the purchase order escrow or has a change of heart while the window of time is pending, the user is free to cancel or modify the purchase order (e.g., change the good(s) or service(s), change the provided payment instrument, and/or the like). Thus, the user is provided additional time to consider the purchase, while reserving the desired good or service at the offered price point, and the merchant is notified of the pending purchase information for inventory planning purposes.

Still referring to FIG. 1, in some arrangements, the provider computing system 104 may be connected to one or more $3^{rd}$ party systems 110 to collect (e.g., via API) or otherwise receive $3^{rd}$ party data including relevant information associated with the pending purchase. For example, in some arrangements, the provider computing system 104 may collect or otherwise receive public records data (e.g., entity, corporation, or other business data) from a public records service, news data from a news service, documents and other document-related data from a document service, media (e.g., video, images, audio, social media, etc.) from a media service, authority data from an authority alert service, and/or the like. In some embodiments, the $3^{rd}$ party data may include reviews of the goods or services associated with the purchase order held in the purchase order escrow, competing offers from other merchants, comparable goods or services offered for sale, news articles corresponding to the goods or services, social media postings corresponding to the goods or services, and/or the like. In some arrangements, the provider computing system 104 analyzes the $3^{rd}$ party data to provide relevant information associated with the pending purchase as a recommendation to the user while the window of time is pending, so that the user can make an informed decision of whether the pending purchase should be cancelled or modified.

In some arrangements, the user device 102, provider computing system 104, merchant system 106, and $3^{rd}$ party systems 110 are communicatively connected to each other via a communication network 112. The communication network 112 is any suitable Local Area Network (LAN) or Wide Area Network (WAN). For example, the communication network 112 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS), Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1x Radio Transmission Technology (1x), General Packet Radio Service (GPRS), Personal Communications Service (PCS), 802.11X, ZigBee, Bluetooth, Wi-Fi, any suitable wired network, combinations thereof, and/or the like. The communication network 112 is structured to permit the exchange of data, values, instructions, messages, and/or the like among the user device 102, the provider computing system 104, the merchant system 106, and the $3^{rd}$ party systems 110.

Figure 2B:
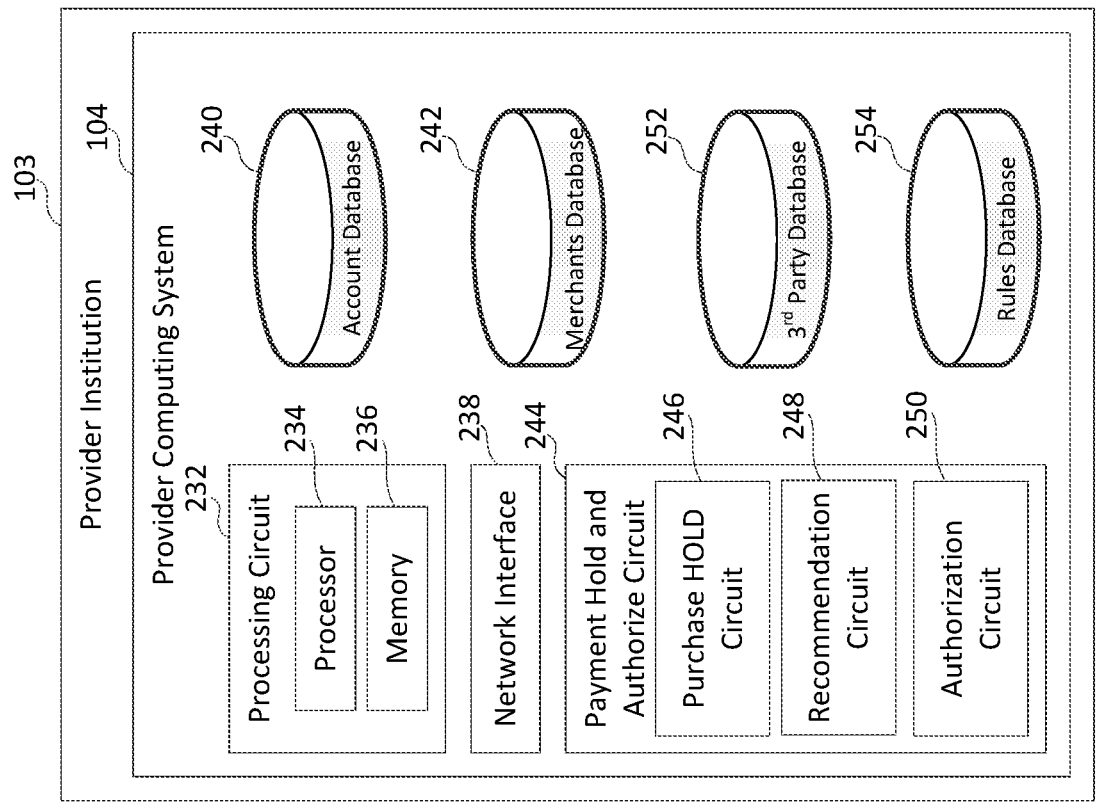
FIG. 2B is a diagram of an example of the provider computing system of the system set forth in FIG. 1, according to some arrangements.
Figure 2A:
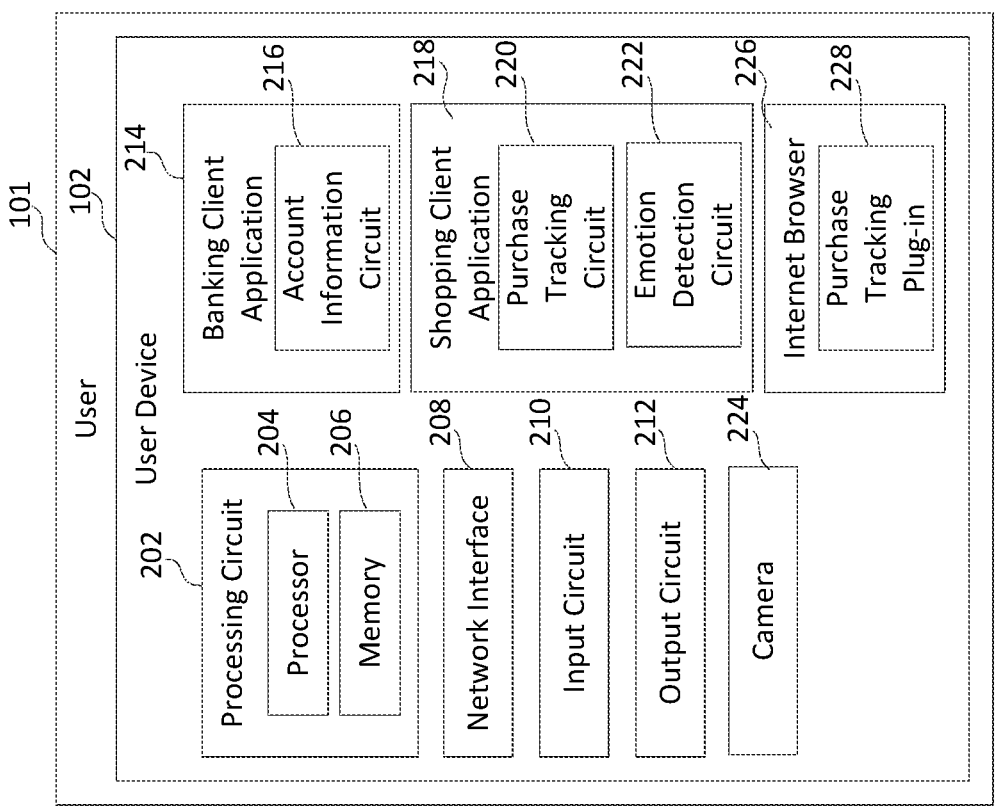
FIG. 2A is a diagram of an example of the user device of the system set forth in FIG. 1, according to some arrangements.

FIG. 2A is a diagram of an example of the user device 102 of the system 100 set forth in FIG. 1, according to some arrangements. FIG. 2B is a diagram of an example of the provider computing system 104 of the system 100 set forth in FIG. 1, according to some arrangements. Referring to FIGS. 1 and 2A, a user (consumer, customer, authorized account user, or originator) 101 operates or otherwise interacts with the user device 102. The user 101 may be any suitable entity (e.g., an individual, a company, or the like). The user device 102 may be any suitable device (e.g., a desktop computer, laptop, tablet, smart phone, mobile phone, or the like).

In some arrangements, the user device 102 includes a processing circuit 202 having a processor 204 and memory 206. The processor 204 can be implemented with a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 206 can be implemented with a Random Access Memory (RAM), Read-Only Memory (ROM), Non-volatile RAM (NVRAM), Flash Memory, hard disk storage, and other suitable electronic storage. The memory 206 stores data and/or computer code for facilitating the various processes described herein. The memory 206 stores instructions or programming logic that, when executed by the processor 204, controls the operations of the user device 102. Moreover, the memory 206 is or includes tangible, non-transient volatile memory or non-volatile memory. Accordingly, the memory 206 includes database components, object code components, script components, or any other type of information structure for supporting the various activities and information structures described herein.

The user device 102 is shown to include various circuits and logic for implementing the activities described herein. For example, the user device 102 includes one or more of the processing circuit 202, network interface 208, input circuit 210, output circuit 212, a banking client application 214, a shopping client application 218, a camera 224, an Internet browser 226, and/or the like. While various circuits, interfaces, and logic with particular functionality are shown, it should be understood that the user device 102 includes any number of circuits, interfaces, and logic for facilitating the functions described herein. For example, the activities of multiple circuits may be combined as a single circuit and implemented on a same processing circuit (e.g., the processing circuit 202), or additional circuits with additional functionality may be further included. For example, while FIG. 2A shows that the banking client application 214 and the shopping client application 218 are separate applications, in other arrangements, the banking client application 214 and the shopping client application 218 may be combined, or at least one of the banking client application 214 and the shopping client application 218 may be omitted.

The network interface 208 is configured for and structured to establish a communication session via the communication network 112 with the provider computing system 104. The network interface 208 may include any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The input circuit 210 is configured to receive user input from the user 101. The output circuit 212 is configured to output information in the form of graphics, sound, tactile feedback (e.g., vibrations), and the like. In this regard, the input circuit 210 and the output circuit 212 are structured to exchange data, communications, instructions, and the like with an input/output component of the user device 102. Accordingly, in some arrangements, the input circuit 210 and the output circuit 212 can be combined into an input/output circuit that includes or is connected to an input/output device such as, but not limited to, a display device, touchscreen, keyboard, microphone, and/or the like. In some arrangements, the input/output circuit includes communication circuitry for facilitating the exchange of data, values, messages, and the like between the input/output device and the components of the user device 102. In some arrangements, the input circuit 210 and the output circuit 212 include machine-readable media for facilitating the exchange of information between the input/output device and the components of the user device 102. In still other arrangements, the input circuit 210 and the output circuit 212 may include any combination of hardware components (e.g., a touchscreen), communication circuitry, and machine-readable media.

In some arrangements, one or more of the banking client application 214 and the shopping client application 218 may be server-based applications executable on the user device 102. In this regard, the user 101 may download the banking client application 214 and/or the shopping client application prior to usage, or at least one of the banking client application 214 or the shopping client application may be pre-installed (e.g., by a manufacturer, distributor, service provider, or the like) on the user device 102. In another arrangement, the banking client application 214 and/or shopping client application 218 are coded into the memory 206 of the user device 110. In still another arrangement, the banking client application 214 and/or shopping client application 218 are web-based interface applications. In this case, the user 101 logs onto or otherwise accesses the web-based interface. In this regard, at least one of the banking client application 214 and shopping client application 218 is supported by a separate computing system comprising one or more servers, processors, network interface modules, etc., that transmit the applications for use to the user device 102. In an arrangement, one or more of the banking client application 214 and/or shopping client application 218 include an API and/or a Software Development Kit (SDK) that facilitate integration of other applications. All such variations and combinations are intended to fall within the spirit and scope of the present disclosure.

The banking client application 214 is communicably coupled to the provider computing system 104 (e.g., the account database 240) via the communication network 112, and is structured to permit management of at least one account of the user 101 via the banking client application 214. In this regard, the banking client application 214 provides indicative displays (or dashboards) of account information such as, but not limited to, current account balances, pending transactions, profile information (e.g., contact information), rewards associated with the account, bill pay information and/or the like. In some examples, a bill pay option is provided by the banking client application 214, where the bill pay option allows the user 101 to pay bills in response to user input. For example, a user may initiate via the banking client application 214 a transfer or payment (e.g., a wire transfer) from an account (e.g., checking or savings) associated with the user 101 to an account associated with a designated beneficiary. The account associated with the designated beneficiary may be established with the same provider institution 103 or a different provider institution.

Thus, via the banking client application 214, the user 101 may pay bills (e.g., credit card, mortgage, and the like), view balances, pay merchants or trading partners (e.g., suppliers and vendors), and otherwise manage accounts. Accordingly, the banking client application 214 includes an account information circuit 216. The account information circuit 216 is linked or otherwise connected to one or more accounts (as stored in the account database 240) associated with the user 101, and permits management of the associated accounts (e.g., transfer balances between accounts, view payment history, and the like) by communicating with the provider computing system 104. In some arrangements, the banking client application 214 is communicably connected to the shopping client application 218. As such, in response to an online purchase via the shopping client application 218, the shopping client application 218 causes the banking client application 214 to update the account associated with an online payment for the online purchase. Accordingly, in some arrangements, the applications 214 and 218 may be communicably connected to each other to enable actions supported by each respective application.

The shopping client application 218 is communicably coupled to the provider computing system 104 (e.g., the account database 240, the merchants database, and/or the like) via the communication network 112. In some arrangements, the shopping client application 218 may be an online shopping application that offers goods and services for sale from the provider computing institution 104 and/or the merchant system 106. In this regard, the shopping client application 218 provides interactive displays (or dashboards) of an online shop or online catalog offering goods and services for purchase over the network 112, and the user 101 may browse the online shop or online catalog via the shopping client application 218 to purchase the goods and services. Thus, via the shopping client application 218, the user 101 may purchase goods and services, track deliveries, request refunds, and/or the like.

In various arrangements, the shopping client application 218 enables a user to purchase goods and services as pending purchases held in escrow, and to manage the pending purchases held in escrow. For example, in some arrangements, when the user selects a good or service for purchase and has navigated to a payment information page within the shopping client application 218, the user is prompted to provide the payment information to purchase the selected good or service. When submitting the payment information, the user is presented a "buy now" purchase option and a "hold now" purchase option. In some arrangements, each of the "buy now" purchase option and the "hold now" purchase option may be presented as an interactive element (e.g., a button, link, and/or the like) selectable by the user. If the user selects the "buy now" purchase option, the purchase is processed as a normal purchase order, and thus, the payment information is normally processed for payment and fulfillment (e.g., scheduled for delivery) by the provider computing system 104 or the merchant system 106 associated with the shopping client application 218. On the other hand, if the user selects the "hold now" purchase option, the selected good(s) or service(s) is reserved for inventory planning purposes and the offered price point is locked-in (e.g., by the provider computing system 104 or the merchant system 106) as in the case of a normal purchase order, but the payment information is held in escrow for a window of time (e.g., a predetermined time) during which the payment information is not processed. Instead, the purchase is a pending purchase order where the provided payment information is automatically processed after the window of time has lapsed.

In some arrangements, while the window of time is pending, the user may allocate funds to the payment vehicle (e.g., checking account, savings account, credit card account, and/or the like) associated with the payment information, change the payment vehicle, cancel the purchase order, modify the purchase order, request funds from other parties associated with the purchase, solicit input from friends or family, and/or the like. Unless the pending purchase order is modified or cancelled before the window of time lapses, the provided payment information is automatically processed for payment and fulfillment (e.g., scheduled for delivery) at the expiration of the window of time.

Accordingly, in some arrangements, the shopping client application 218 enables the user to manage the pending purchase order, and sends notifications to the user device 102 to remind the user of the pending purchase order. For example, in some embodiments, the shopping client application 218 may notify the user of the user device 102 when the window of time is close to expiration, when a pending purchase order has been created, when the user is solicited for input with regards to a pending purchase order created by another, when a message is received from the merchant or the supplier, and/or the like. In some arrangements, the shopping client application 218 may send periodic reminders to the user to solicit user input corresponding to a pending purchase order. For example, in some embodiments, the shopping client application 218 may periodically cause a notification message to appear on the user device to remind the user of the upcoming pending purchase, and/or to solicit input from the user.

In more detail, in some arrangements, the shopping client application 218 includes a purchase tracking circuit 220. In some arrangements, in response to the user submitting a purchase order by selecting the "hold now" purchase option, the purchase tracking circuit 220 submits a pending purchase order corresponding to the submitted purchase order to the provider computing system 104 to be processed as a pending purchase order held in escrow. For example, in some arrangements, the purchase tracking circuit 220 may simply transmit the originally submitted purchase order to the provider computing system 104 to be processed as a pending purchase order held in escrow. In another example, the purchase tracking circuit 220 may first format the submitted purchase order to include data, attributes, parameters, and/or identifiers used by the provider computing system 104 to identify and process the submitted purchase order as a pending purchase order. For example, in some embodiments, the purchase tracking circuit 220 may append a unique identifier to the submitted purchase order that is used by the provider computing system 104 to distinguish between normal purchase orders and pending purchase orders. In yet another example, the purchase tracking circuit 220 may extract relevant information (e.g., payment information, merchant information, selected good or service for purchase, and/or the like) from the submitted purchase order, and may generate the pending purchase order from the extracted information having a suitable format used by the provider computing system 104 to process the pending purchase order. In still another example, the purchase tracking circuit 220 may transmit the submitted purchase order to an allocated address (e.g., a port, internet protocol IP address, uniform resource locator (URL), and/or the like) associated with the provider computing system 104 for processing pending purchase orders.

In some arrangements, the shopping client application 218 enables the user to manage one or more pending purchase orders. For example, in some arrangements, the user may manage notification settings and/or preferences, request an extension of the window of time, modify the payment instrument provided in the submitted payment information, change the payment instrument, cancel the pending purchase order, remove a good or service from the pending purchase order, add a good or service to the pending purchase order, solicit input from friends or family for the goods or services in the pending purchase order, provide input to friends and family for a good or service in a pending purchase order created by the user or by another, send messages to the merchant or supplier associated with the good or service, change a delivery address for the pending purchase order, and/or the like.

In some arrangements, the shopping client application 218 may detect a user's emotions with respect to a pending purchase. For example, in some arrangements, the shopping client application 218 includes an emotion detection circuit 222 configured to periodically solicit the user for user input corresponding to the user's emotions with respect to a pending purchase. For example, in some arrangements, the emotion detection circuit 222 may solicit the user for a selection of a thumbs up icon or a thumbs down icon representing the user's emotional state with respect to a pending purchase. In another example, the emotion detection circuit 222 is configured to control a camera 224 on the user device 102 to capture the user's facial expressions when viewing a notification of the approaching pending purchase. In this example, the emotion detection circuit 222 or the provider computing system 104 may have suitable facial detection algorithms or image processing algorithms to detect the user's emotions from the facial expressions captured by the camera 224. For example, if the user's facial expressions express displeasure in response to the reminder of the upcoming pending purchase, the emotion detection circuit 222 or the provider computing system 104 can infer that the user is upset or unhappy about the upcoming pending purchase. On the other hand, if the user's facial expressions express joy in response to the reminder of the upcoming pending purchase, the emotion detection circuit 222 or the provider computing system 104 can infer that the user is happy about the upcoming pending purchase. The provider computing system 104 may use the detected emotional state of the user to generate a recommendation corresponding to the pending purchase order.

Still referring to FIG. 2A, in some arrangements, the Internet browser 226 is a software application that is installed (e.g., pre-installed or downloaded) on the user device 102, and enables the user to access information on the World Wide Web (e.g., via the network 112). Thus, in some arrangements, the Internet browser 226 is structured to facilitate online shopping from any suitable online shopping website accessible via the World Wide Web. For example, in various arrangements, the Internet browser 226 may be any suitable web browser (e.g., Internet Explorer, Chrome, Safari, Fire Fox, Opera, and/or the like) that enables the user to access an online shopping website over the World Wide Web to browse goods and services offered for sale, purchase goods and services, track deliveries, request refunds, and/or the like, without the need of downloading or installing a separate client application (e.g., the shopping client application 218). Accordingly, via the Internet browser 226, the user can purchase goods and services from the online shopping website via the World Wide Web through the normal purchase order processing procedure (e.g., the "buy now" purchase option) natively associated with the online shopping website.

According to various arrangements, the Internet browser 226 enables the user to purchase goods and services from any suitable online shopping website over the World Wide Web as pending purchases held in escrow as described according to one or more arrangements herein. For example, in some arrangements, the Internet browser 226 is configured to detect (e.g., via a URL or via electronic form data) when the user has navigated to a payment information page within an online shopping website via the Internet browser 226, and in response, automatically appends the "hold now" purchase option on the payment information page. For example, in some arrangements, when the Internet browser 226 retrieves the payment information page for display, the Internet browser 226 may insert code associated with the "hold now" purchase option into the retrieved payment information page prior to displaying the payment information page to the user. In another example, the Internet browser 226 may overlay a pop-up window corresponding to the "hold now" purchase option over a suitable location on the payment information page. In yet another example, the Internet browser 226 may embed an inline frame (iframe) corresponding to the "hold now" purchase option at a suitable location on the payment information page. In other examples, another type of add-on application can be provided to the Internet browser 226 to augment the manner in which the Internet browser 226 functions to provide the "hold now" option as described.

Accordingly, in various arrangements, the user can optionally select the "hold now" purchase option provided by the Internet browser 226 on the native payment information page of the online shopping website to utilize the purchase order escrow services provided by the provider computing system 104. Thus, the purchase order escrow features described with reference to the shopping client application 218 can be seamlessly implemented for any suitable online shopping website without the need of a separate client application, or without having to modify the code or functionality of the online shopping website. Accordingly, the Internet browser 226 is communicably connected to the provider computing system 104 via the communication network 112 to facilitate processing of the pending purchase orders from any suitable online shopping web site accessible over the World Wide Web.

In more detail, in some arrangements, the Internet browser 226 includes a purchase tracking plug-in 228, which may be similar to the purchase tracking circuit 220 of the shopping client application 218. In some arrangements, the purchase tracking plug-in 228 is communicatively coupled to the provider computing system 104, and is configured to provide purchase orders to the provider computing system 104 to be processed as pending purchase orders held in escrow. In some arrangements, the purchase tracking plug-in 228 is an add-on, add-in, or extension that augments (e.g., adds) the "hold now" feature as well as other features described herein to the Internet browser 226. It that regard, the purchase tracking plug-in 228 is configured to be coupled to the application program interface (API) of the internet browser 226. However, the present disclosure is not limited thereto, and in other arrangements, the functions and features of the purchase tracking plug-in 228 may be coded in the software application of the Internet browser 226.

In some arrangements, the purchase tracking plug-in 228 monitors the user's activities over the World Wide Web via the Internet browser 226, and detects when the user has navigated to a payment information page within an online shopping web site (e.g., via a URL and/or electronic form fields). In some arrangements, in response to submitting a purchase order by selecting the "hold now" purchase option, the purchase tracking plug-in 228 submits a pending purchase order corresponding to the submitted purchase order to the provider computing system 104 to be processed as a pending purchase order held in escrow. For example, in some arrangements, the purchase tracking plug-in 228 may simply transmit the originally submitted purchase order to the provider computing system 104 to be processed as a pending purchase order held in escrow. In another example, the purchase tracking plug-in 228 may first format the submitted purchase order to include data, attributes, parameters, and/or identifiers used by the provider computing system 104 to identify and process the submitted purchase order as a pending purchase order. For example, in some embodiments, the purchase tracking plug-in 228 may append a unique identifier to the submitted purchase order that is used by the provider computing system 104 to distinguish between normal purchase orders and pending purchase orders. In yet another example, the purchase tracking plug-in 228 may extract relevant information (e.g., payment information, merchant information, selected good or service for purchase, and/or the like) from the submitted purchase order, and may generate the pending purchase order from the extracted information having a suitable format used by the provider computing system 104 to process the pending purchase order. In still another example, the purchase tracking plug-in 228 may transmit the submitted purchase order to an allocated address (e.g., a port, internet protocol IP address, uniform resource locator (URL), and/or the like) associated with the provider computing system 104 for processing pending purchase orders.

Accordingly, in various arrangements, the provider computing system 104 receives pending purchase orders from the shopping client application 218 and/or the Internet browser 226. In various arrangements, the provider computing system 104 holds the payment information in the pending purchase orders in escrow, and automatically submits or processes the payment information for payment and fulfillment (e.g., delivery) upon the expiration of a window of time. Thus, the user is enabled to make changes to or cancel the pending purchase orders during the pendency of the window of time. In some embodiments, the provider computing system 104 provides a notification to a merchant of the merchant system 106 corresponding to the pending purchase orders, but withholds the payment information from the merchant. Thus, the merchant can use the information provided in the notification for inventory planning purposes, but cannot process any payments corresponding to the pending purchase orders until the payment information is received at the expiration of the window of time.

For example, referring now to FIGS. 1 through 2B, in some arrangements, the provider institution 103 is a financial institution or the like having at least one associated provider computing system 104. In some arrangements, the provider institution 103 provides products and services such as, but not limited to, credit card accounts, mobile wallet, checking/saving accounts, retirement accounts, mortgage accounts, loan accounts, investment accounts, and/or the like to the user (or consumer) 101 via the provider computing system 104. However, the present disclosure is not limited thereto, and in other embodiments, the provider institution 103 may not be a financial institution, and instead, may be associated with an online shopping provider that offers various goods and services for sale via the shopping client application 218 and/or via a website that is accessible by the Internet browser 222 over the World Wide Web. For example, in some arrangements, the provider institution 103 may provide an online store or an online catalog offering various goods and services for sale by the provider institution 103, its affiliates, or one or more merchants associated with one or more merchant systems (e.g., the merchant system 106). In other arrangements, the provider institution 103 may not offer an online store or online catalog, but instead, may provide purchase order escrow services for online shopping websites or online stores associated with one or more merchant systems (e.g., the merchant system 106).

Accordingly, in some arrangements, the provider computing system 104 includes a processing circuit 232 including a processor 234 and a memory device 236. The processor 234 can be implemented with a general-purpose processor, an ASIC, one or more FPGAs, a DSP, a group of processing components that are distributed over various geographic locations or housed in a single location or device, or other suitable electronic processing components. The memory 236 can be implemented with RAM, NVRAM, ROM, Flash Memory, hard disk storage, cloud storage, and other suitable electronic storage devices. The memory 236 stores data and/or computer code for facilitating at least some of the various processes described herein. The memory 236 includes tangible, non-transient volatile memory, or non-volatile memory. The memory 236 stores instructions or programming logic that, when executed by the processor 234, controls the operations of the provider computing system 104. In some arrangements, the processor 234 and the memory 236 form various processing circuits in the provider computing system 104.

As shown in FIG. 2B, the provider computing system 104 includes a network interface 238. The network interface 238 is structured for sending and receiving data over the communication network 112 (e.g., to and from the user device 102, the merchant system 106, the $3^{rd}$ party systems 110, and/or the like). Accordingly, the network interface 238 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

In some arrangements, the provider computing system 104 includes an account database 240. In some arrangements, the account database 240 may store customer profile information and account information relating to one or more accounts associated with the user 101 and other customers of the provider institution 103. For example, in some arrangements, the account database 240 stores transaction history data of transactions (e.g., payment transactions) made by the user 101 using one or more accounts and by other customers, for example, with the banking client application 214 and/or other suitable applications. In some arrangements, the account database 240 stores the payment information and other information corresponding to the pending purchase orders held in escrow for the user and other customers of the provider institution 103. In some arrangements, the provider computing system 104 accesses the payment information and other information associated with the pending purchase orders stored in the account database 240 to generate and submit the purchase orders for payment and fulfillment at the expiration of the window of time.

In some arrangements, the provider computing system 104 includes a merchants database 242. The merchants database 242 may be an internal database with respect to the provider computing system 104 or an external database accessible by the provider computing system 104 (e.g., via API). In some arrangements, the merchants database 242 may have an internal database component and an external database component for storing data corresponding to an external database maintained by the merchant system 106. In some arrangements, the internal database component may store configuration information and other data corresponding to the merchant. For example, in some arrangements, the merchant may provide configuration information (e.g., parameters, expected form data, and/or the like) corresponding to the format in which the merchant system 106 expects to receive the notifications for processing pending purchase orders and to receive the purchase orders for payment and fulfillment at the expiration of the window of time. In some arrangements, the configuration information may also include acceptable window of time periods that the merchant is willing to reserve goods and services, and/or the like. In some arrangements, the external database component may store offerings data corresponding to goods or services offered from the merchant's online store or catalog associated with the merchant. For example, in some arrangements, the provider computing system 104 may have an interface to pull or receive (e.g., via an API or the like) the offerings data from the external database maintained by the merchant system 106 periodically, as needed, or desired. However, the present disclosure is not limited thereto, and in other arrangements, the external database component may be omitted so that the provider computing system 104 does not store the offerings data, and instead, pulls or otherwise receives the offerings data from the external database maintained by the merchant periodically or as needed or desired.

In some arrangements, the provider computing system 104 includes a $3^{rd}$ party database 252 that stores $3^{rd}$ party data received from the $3^{rd}$ party systems 110. For example, the $3^{rd}$ party data may include public records data (e.g., entity, corporation, or other business data) from a public records service (e.g., secretary of state), news data from a news service, documents and other document-related data from a document service, media (e.g., video, images, audio, social media, etc.) from a media service, authority data from an authority alert service, and/or the like. However, the present disclosure is not limited thereto, and in some arrangements, the $3^{rd}$ party database 242 may be omitted. For example, the provider computing system 104 may have an interface to pull or receive data (e.g., via an API) periodically, as needed, or desired from one or more external databases associated with the $3^{rd}$ party systems 110.

In some arrangements, the provider computing system 104 includes a rules database 254 for storing rules. In some arrangements, the provider computing system 104 may use the rules to determine the conditions in which to notify the user of a pending purchase order. In some arrangements, the rules may be user-defined and/or automatically generated. For example, in some arrangements, a user may define how to handle pending purchase orders that are close to expiration (e.g., the window of time has lapsed) based on user preferences. For example, a user may define the circumstances in which the user should be alerted of a pending purchase order that violate one or more of the rules. In another example, a user may define a rule to be notified hourly of a pending purchase order on the day that the pending purchase order is set to expire. In yet another example, a user may define a rule to automatically cancel a pending purchase order when a recommendation provided by the provider computing system 104 (e.g., based on the $3^{rd}$ party data) is to not purchase the good or service. In still another example, a user may define a rule to automatically proceed with any pending purchase orders having a payment due that is less than (or more than) a threshold amount after a predetermined period of time has lapsed (e.g., 2 days). Similarly, a user may define a rule to automatically cancel any pending purchase orders having a payment due that exceeds an account balance on the day that the pending purchase order is expected to be processed for payment and fulfillment.

In some arrangements, the rules may be predefined or automatically generated by the provider computing system 104. For example, predefined rules may include default rules for any rule that the user does not specifically define (or override) with a user-defined rule. Automatically generated rules may be automatically generated to override one or more default rules based on market trends, data mining, and/or machine learning. In some arrangements, the rules may include exceptions (or whitelists) to one or more of the rules, in which the user defines situations in which a rule may be ignored. For example, while a general rule to notify the user of a pending purchase only when a purchase price of the pending purchase exceeds a particular threshold value may be defined, the user may include an exception to the rule for a pending purchase from a particular account (e.g., a child's account) or for a pending purchase of a particular type of good or service. In another example, a user may define a rule to never proceed with submitting the payment information when the goods or services are provided from a particular merchant or for a particular type of good or service. Upon receiving user-defined or automatically generated rules, the rules are indexed and stored in the rules database 254.

Still referring to FIG. 2B, in some arrangements, the provider computing system 104 includes a payment hold and authorize circuit 244. The payment hold and authorize circuit 244 processes the pending purchase orders received from the shopping client application 218 and/or the Internet browser 226 to hold the pending purchase orders in escrow (e.g., store in the account database 240). For example, the payment hold and authorize circuit 244 can determine the good(s) and/or service(s) associated with the pending purchase order, the merchant (e.g., the merchant system 106) associated with the good(s) and/or service(s) that should be notified of the pending purchase order for inventory planning purposes, the offered purchase price point for the good(s) and/or service(s), the payment information provided by the user, and/or the like. In some arrangements, the payment hold and authorize circuit 244 generates a notification corresponding to the pending purchase order, and provides the notification to the merchant system 106 to reserve the good(s) and/or service(s) associated with the pending purchase order.

For example, in some arrangements, the notification includes information desired by the merchant system 106 to reserve the good(s) and/or service(s) associated with the pending purchase order, but excludes the payment information. In some arrangements, the payment hold and authorize circuit 244 analyzes external data (e.g., $3^{rd}$ party data, emotion detection data, and/or the like) corresponding to pending purchase order (e.g., the good(s) and/or service(s)

associated with the pending purchase order) and provides a recommendation to the user to proceed with, cancel, or modify the pending purchase order.

Accordingly, in various arrangements, the payment hold and authorize circuit 244 is communicatively connected to the account database 240, the merchants database 242, the $3^{rd}$ party database 252, the rules database 254, and/or other databases managed by or connected to the provider computing system 104. For example, the payment hold and authorize circuit 244 is connected to the account database 240 to access (e.g., query) the account/profile information and pending purchase order information held in escrow for the user. The payment hold and authorize circuit 244 is connected to the merchants database 242 to access (e.g., query) the offering data and/or configuration data provided by the merchant system 106. The payment hold and authorize circuit 244 can also collect and analyze the $3^{rd}$ party data by accessing (e.g., querying) the $3^{rd}$ party database 252 or other external $3^{rd}$ party databases. Further, the payment hold and authorize circuit 244 is connected to the rules database 254 to access (e.g., query) the user-defined and/or automatically generated rules.

In some arrangements, the payment hold and authorize circuit 244 is operatively connected to one or more of the components of the provider computing system 104. For example, the payment hold and authorize circuit 244 is connected to the network interface 238 for communicating with one or more of the user device 102 (e.g., the banking client application 214, the shopping client application 218, and/or the Internet browser 226), the merchant system 106, and/or the $3^{rd}$ party systems 110. In some arrangements, the payment hold and authorize circuit 244 may be implemented with the processing circuit 232. For example, the payment hold and authorize circuit 244 can be implemented as a software application stored within the memory 236 and executed by the processor 234. Accordingly, such examples can be implemented with minimal or no additional hardware costs. However, in other arrangements, the payment hold and authorize circuit 244 may be implemented on dedicated hardware specifically configured for performing the operations of the payment hold and authorize circuit 244 described herein.

In more detail, in some arrangements, the payment hold and authorize circuit includes a purchase hold circuit 246, a recommendation circuit 248, and an authorization circuit 250. In some arrangements, the purchase hold circuit 246 stores the pending purchase orders received from the shopping client application 218 and/or the Internet browser 226 in the purchase order escrow of the account database 240. In some arrangements, the purchase hold circuit 246 analyzes the pending purchase orders to generate and send a notification to the merchant system (e.g., the merchant system 106) associated with the pending purchase order, so that the corresponding merchant can reserve the good(s) and/or service(s) identified in the notification. For example, in some arrangements, the purchase hold circuit 246 generates the notification to include information corresponding to the identity of the good(s) or service(s) associated with the pending purchase order, the price point for the good(s) or service(s), the length of the window of time that the payment information will be withheld in escrow, and/or the like. However, in some arrangements, the purchase hold circuit 246 withholds the payment information associated with the pending purchase order from the merchant, and instead, stores the payment information in the purchase order escrow for later retrieval (e.g., at the expiration of the window of time).

In some arrangements, the recommendation circuit 248 generates a recommendation corresponding to the pending purchase order, and provides the recommendation to the user via the user device 102 during the pendency of the window of time. For example, in some arrangements, the recommendation circuit 248 analyzes the $3^{rd}$ party data (e.g., stored in the $3^{rd}$ party database 242 or otherwise accessible by the provider computing system 104) to identify relevant information concerning the good(s) or service(s) associated with the pending purchase order, and provides the relevant information to the user via the user device 102 during the pendency of the window of time. For example, in some arrangements, the $3^{rd}$ party data may include relevant information concerning, for example, reviews of the goods or services associated with the pending purchase order, competing offers from other merchants, comparable goods or services offered for sale, news articles corresponding to the goods or services, social media postings corresponding to the goods or services, and/or the like. Accordingly, instead of the user having to directly research the good(s) and/or service(s) associated with the pending purchase order by searching for and reading through available $3^{rd}$ party data to identify the relevant information, the recommendation circuit 248 analyzes the $3^{rd}$ party data to automatically data mine for the relevant information, and the relevant information is provided to the user so that the user can decide whether the pending purchase order should be cancelled or modified.

In some arrangements, the recommendation circuit 248 analyzes emotional state data provided by the emotion detection circuit 222 to generate a recommendation concerning the pending purchase order. For example, in some arrangements, the recommendation circuit 248 receives the user's responses (e.g., thumbs up, thumbs down, happy facial expression, sad facial expression, neutral facial expression, and/or the like) to each of the periodic reminders of the upcoming purchase from the emotion detection circuit 222, and analyzes each of the responses to determine if the user is generally happy about the upcoming purchase, displeased about the upcoming purchase, or neutral about the upcoming purchase. For example, in some arrangements, the recommendation circuit 248 may assign a point value to each response, where a 1 is assigned for a positive response, −1 is assigned for a negative response, and 0 is assigned for a neutral response. In this case, if the total value of the received responses is a positive number, the recommendation circuit 248 may infer that the user is generally happy about the upcoming purchase. On the other hand, if the total value of the received responses is a negative number, the recommendation circuit 248 may infer that the user is generally displeased about the upcoming purchase. Similarly, if the total value of the received responses is equal to or close to zero (0), the recommendation circuit 248 may infer that the user is generally neutral about the upcoming purchase. However, the present disclosure is not limited thereto, and in another example, the recommendation circuit 248 may infer the user's emotional state based on an average value of the responses. In some arrangements, based on the determined emotional state, the recommendation circuit 248 may provide a corresponding recommendation to the user to modify, cancel, or proceed with the pending purchase.

In some arrangements, the recommendation circuit 248 may analyze the user's transaction histories or present and historical account balances associated with one or more accounts of the user established with the provider institution 103 to generate a recommendation for the pending purchase. For example, if the user's transaction histories or account balances indicate that the user is generally financially unstable, the recommendation circuit 248 may recommend that the user not proceed with the pending purchase. Similarly, in some arrangements, the recommendation circuit 248 may analyze the user's transaction histories and historical account balances to forecast the user's financial status at the time the pending purchase is scheduled to be submitted for payment and delivery. For example, in some arrangements, the recommendation circuit 248 may identify monthly recurring payments that are scheduled or expected to be made each month in order to forecast the user's financial status.

In some arrangements, the authorization circuit 250 determines whether each of one or more conditions are satisfied in order to authorize the release of the payment information held in escrow to the merchant (e.g., the merchant system 106) to process for payment and fulfillment (e.g., delivery). For example, in the most basic sense, the one or more conditions include at least a time corresponding to the window of time for forwarding the payment information from the purchase order escrow to the merchant for processing. In this case, if the window of time has lapsed and the pending purchase order has not yet been cancelled, this condition is satisfied and the provider computing system 104 is authorized to forward the payment information for processing. According to various arrangements, the one or more conditions can further include other conditions that must be satisfied in order to release the payment information to the merchant for payment and fulfillment. In some arrangements, the one or more conditions may be user-defined or automatically generated and stored in the rules database 254. For example, if the purchase is a group purchase, the user may specify that other users must provide authorization or must contribute to a portion of the purchase price before authorizing the release of the payment information for payment and fulfillment. In this case, if the other users do not provide authorization or do not provide their contributions to a portion of the purchase price before the window of time has lapsed, the release of the payment information is not authorized and the pending purchase order may be automatically cancelled. Similarly, in another example, if the purchase requires authorization from a third party (e.g., a parent, guardian, manager, and/or the like), the release of the payment information may not be authorized unless authorization from the third party is provided before the window of time has lapsed. Thus, in various arrangements, the authorization circuit 250 may access (e.g., query) one or more user-defined or automatically generated rules stored in the rules database 254 to determine if each condition is satisfied before authorizing the release of the payment information.

Accordingly, in various arrangements, the provider computing system 104 processes pending purchase orders received from the shopping client application 218 and/or the Internet browser 244 to withhold the payment information from the merchant in escrow for a window of time. In some arrangements, the provider computing system 104 provides a notification to the merchant system 106 corresponding to the pending purchase order so that the merchant can reserve the good(s) and/or service(s) until the expiration of the window of time. In some arrangements, the provider computing system 104 releases the payment information to the merchant system 106 for processing and payment at the expiration of the window of time. In some arrangements, the provider computing system 104 releases the payment information to the merchant system 106 only if one or more user-defined or automatically generated conditions (e.g., rules) are satisfied prior to the expiration of the window of time. Thus, during the pendency of the window of time, the user is free to make changes to the pending purchase order or to cancel the pending purchase order at any time before the expiration of the window of time.

Figure 3:
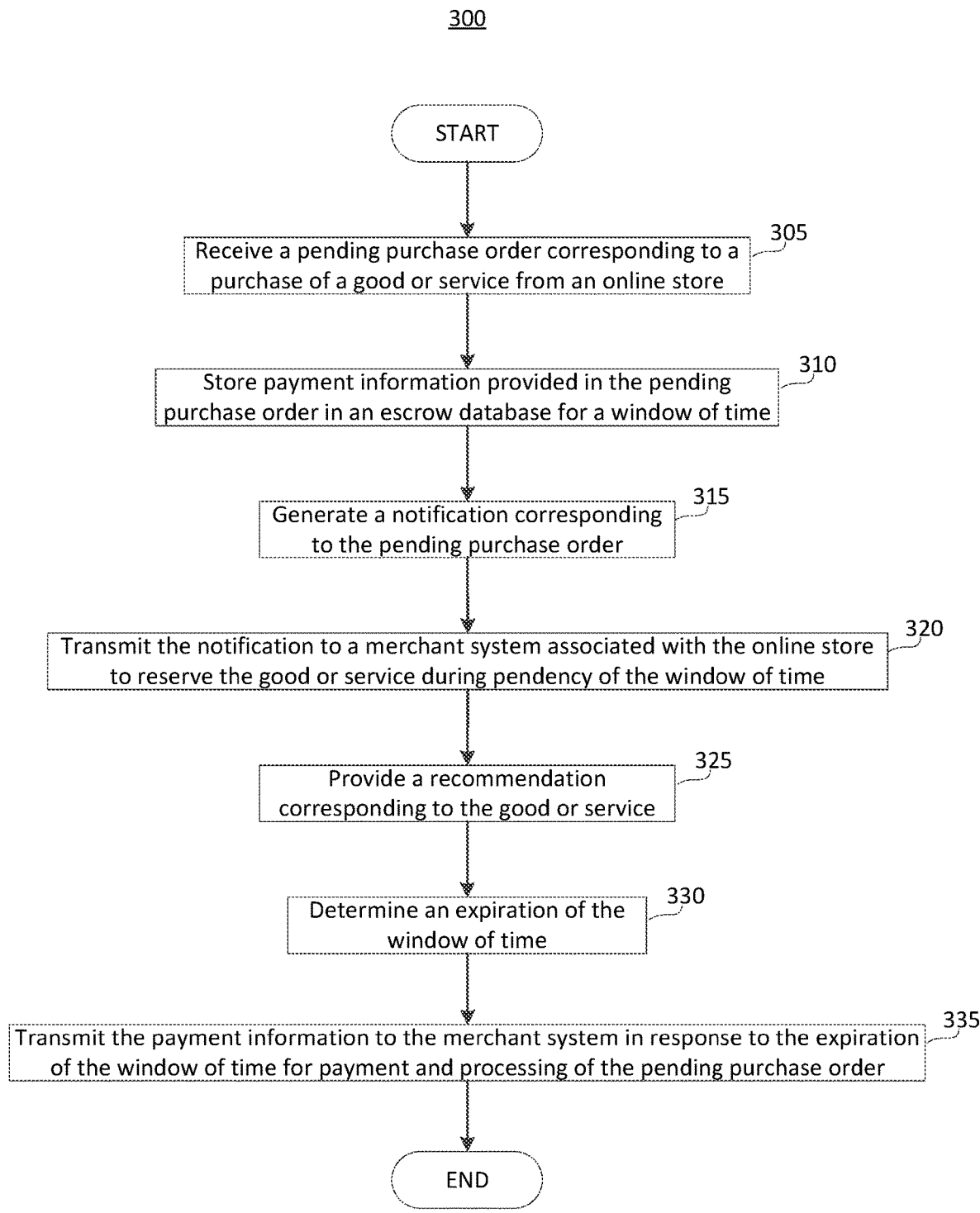
FIG. 3 is a flow chart of a process of providing payment escrow services for online purchases, according to some arrangements.

FIG. 3 is a flow chart of a process of providing payment escrow services for online purchases, according to some arrangements. Referring the FIG. 3, the process starts, and a pending purchase order corresponding to a purchase of a good or service from an online store is received at block 305. In some arrangements, the online store is presented to the user device via the shopping client application 218. In some arrangements, the online store is presented to the user device via the Internet browser 226. Thus, in various arrangements, the pending purchase order is received from the shopping client application 218 or the Internet browser 226 in response to a selection of an interactive element (e.g., the "hold now" option) presented on the payment page of the online store via the user device 102. In some arrangements, the pending purchase order includes payment information provided by the user via the user device 102 on the payment page of the online store.

In some arrangements, the payment information corresponding to the pending purchase order is stored in an escrow database (e.g., the account database 240 or the like) at block 310 for a window of time. Further, a notification is generated corresponding to the pending purchase order at block 315. In some arrangements, the notification may include information corresponding to the identity of the good(s) or service(s) associated with the pending purchase order, the price point for the good(s) or service(s), the length of the window of time that the payment information will be withheld in escrow, and/or the like, but excludes the payment information. In some arrangements, the notification is transmitted to a merchant system associated with the online store at block 320. In some arrangements, the merchant system reserves the goods or services associated with the pending purchase order at the offered price point for the length of the window of time based on the notification.

In some arrangements, a recommendation corresponding to the good or service associated with the pending purchase order is provided to the user via the user device 102 during a pendency of the window of time at block 325. In some arrangements, the recommendation includes $3^{rd}$ party data corresponding to the good or service. In some arrangements, the $3^{rd}$ party data includes, for example, reviews of the good or service, competing offers, comparable goods or services, news articles corresponding to the good or service, social media postings corresponding to the good or service, and/or the like. In some arrangements, the recommendation is generated corresponding to emotion detection data received from the emotion detection circuit 222. For example, in some arrangements, a reminder is provided on the user device of the pending purchase order and the emotion detection data corresponding to an emotional state of the user in response to the reminder is captured. For example, in some arrangements, the reminder solicits the user for user input (e.g., a selection of a thumb up icon, a thumbs down icon, a smiley face icon, frowny face icon, and/or the like), and the emotional state data is captured when the user provides the user input. In another example, in some arrangements, when the user views a reminder on the user device, a camera coupled to the user device is controlled to record an image of the user's face when viewing the reminder. In this case, the emotional state data is captured when the image of the user's face is recorded by the camera.

In some arrangements, the expiration of the window of time is determined at block 330. If the user has not cancelled or modified the pending purchase order before the expiration of the window of time, the payment information associated with the pending purchase order is transmitted to the merchant (e.g., the merchant system 106) at block 335 at the expiration of the window of time. The merchant can then process the pending purchase order for payment and fulfillment (e.g., delivery), and the process ends.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims, and their equivalents.

What is claimed:

1. A computing system comprising:
   one or more processors; and
   one or more computer-readable storage media communicatively coupled to the one or more processors and having instructions stored thereon that, when executed by the one or more processors, cause the one or more processors to:
      detect a user device associated with a user has navigated to a payment page of an online store;
      insert code associated with a purchase option into the payment page at a location prior to presenting the payment page on the user device, wherein the purchase option comprises a first interactive element selectable by the user device;
      receive a pending purchase order from the user device in response to a selection of the first interactive element of the purchase option presented on the payment page of an online store via the user device, the pending purchase order corresponding to a purchase of a good or service from the online store and including payment information;
      store the payment information in an escrow database for a window of time;
      generate a notification corresponding to the pending purchase order, the notification including information corresponding to the good or service and excluding the payment information;
      transmit the notification to a merchant system associated with the online store to reserve the good or service during pendency of the window of time;
      capture biometric state data of the user from the user device, wherein the user device captures the biometric state data via an input circuit of the user device;
      assign a point value to the biometric state data, wherein the point value has a magnitude and sign;
      generate a recommendation to cancel, proceed, or modify the pending purchase order based on an evaluation of the point value;
      provide the recommendation on the user device during the pendency of the window of time.

2. The system of claim 1, wherein the instructions further cause the one or more processors to:
   determine an expiration of the window of time; and
   transmit the payment information to the merchant system for payment and processing of the pending purchase order in response to the expiration of the window of time.

3. The system of claim 2, wherein the instructions further cause the one or more processors to:
   analyze third party data associated with the pending purchase order based on accessing a third party system communicably coupled to the one or more processors via an application programming interface (API);
   generate a second recommendation to cancel, proceed, or modify the pending purchase order based on the third party data; and
   provide the second recommendation on the user device during the pendency of the window of time.

4. The system of claim 3, wherein analyzing the third party data further comprises searching the third party data to identify relevant information associated with the pending purchase order.

5. The system of claim 4, wherein the third party data includes reviews of the good or service, competing offers, comparable goods or services, news articles corresponding to the good or service, or social media postings corresponding to the good or service.

6. The system of claim 3, wherein the instructions further cause the one or more processors to:
   provide a reminder on the user device of the pending purchase order.

7. The system of claim 6, wherein the capture of the biometric state data includes:
   presenting the reminder on the user device during the pendency of the window of time, wherein the reminder solicits the user for user input corresponding to the pending purchase order; and
   receiving the user input as the biometric state data.

8. The system of claim 6, wherein the capture of the biometric state data includes:
   presenting the reminder on the user device during the pendency of the window of time;
   controlling a camera coupled to the user device to record an image of the user's face when viewing the reminder; and
   receiving the recorded image as the biometric state data.

9. The system of claim 1, wherein the online store is accessed via a client application associated with the online store that is installed on the user device, and the purchase option is presented by the client application.

10. The system of claim 1, wherein the online store is accessed via a web browser installed on the user device, and the purchase option is appended to the payment page of the online store by the web browser installed on the user device.

11. A method comprising:
    detecting, by one or more processors of a computing system, a user device has navigated to a payment page of an online store;
    inserting, by the one or more processors, code associated with a purchase option into the payment page at a location prior to presenting the payment page on the user device;
    receiving, by the one or more processors, a pending purchase order from the user device in response to a selection of purchase option presented on the payment page of an online store via the user device, the pending purchase order corresponding to a purchase of a good or service from the online store and including payment information;

storing, by the one or more processors in an escrow database, the payment information for a window of time, wherein the escrow database is communicably coupled to the one or more processors;

generating, by the one or more processors, a notification corresponding to the pending purchase order, the notification including information corresponding to the good or service and excluding the payment information; and transmitting, by the one or more processors, the notification to a merchant system associated with the online store to reserve the good or service during pendency of the window of time, capturing, by the one or more processors, biometric state data of the user from the user device, wherein the user device captures the biometric state data via an input circuit of the user device;

assigning, by the one or more processors, a point value to the biometric state data, wherein the point value has a magnitude and sign;

generating, by the one or more processors, a recommendation to cancel, proceed, or modify the pending purchase order based on an evaluation of the point value;

providing the recommendation on the user device during the pendency of the window of time.

12. The method of claim 11, further comprising:
determining, by the one or more processors, an expiration of the window of time; and
transmitting, by the one or more processors, the payment information to the merchant system for payment and processing of the pending purchase order in response to the expiration of the window of time.

13. The method of claim 12, further comprising:
analyzing, by the one or more processors, third party data associated with the pending purchase order based on accessing a third party system communicably coupled to the one or more processors via an application programming interface (API);
generating, by the one or more processors, a second recommendation to cancel, proceed, or modify the pending purchase order based on the third party data; and providing, by the one or more processors, the second recommendation on the user device during the pendency of the window of time.

14. The method of claim 13, wherein analyzing the third party data further comprises searching the third party data to identify relevant information associated with the pending purchase order.

15. The method of claim 14, wherein the third party data includes reviews of the good or service, competing offers, comparable goods or services, news articles corresponding to the good or service, or social media postings corresponding to the good or service.

16. The method of claim 13, further comprising:
providing, by the one or more processors, a reminder on the user device of the pending purchase order.

17. The method of claim 16, wherein the capture of the biometric state data includes:
presenting the reminder on the user device during the pendency of the window of time, wherein the reminder solicits the user for user input corresponding to the pending purchase order; and
receiving the user input as the biometric state data.

18. The method of claim 16, wherein the capture of the biometric state data includes:
presenting the reminder on the user device during the pendency of the window of time;
controlling a camera coupled to the user device to record an image of the user's face when viewing the reminder; and
receiving the recorded image as the biometric state data.

19. The method of claim 11, wherein the online store is accessed via a client application associated with the online store that is installed on the user device, and the purchase option is presented by the client application.

20. The method of claim 11, wherein the online store is accessed via a web browser installed on the user device, and the purchase option is appended to the payment page of the online store by the web browser installed on the user device.

* * * * *